(12) United States Patent
Kelly

(10) Patent No.: US 6,336,166 B1
(45) Date of Patent: *Jan. 1, 2002

(54) MEMORY CONTROL DEVICE WITH SPLIT READ FOR ROM ACCESS

(75) Inventor: James D. Kelly, Aptos, CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,922

(22) Filed: Apr. 7, 1997

(51) Int. Cl.$^7$ .............................................. G06F 12/00
(52) U.S. Cl. ............................ 711/118; 711/102; 711/5
(58) Field of Search ............................ 711/5, 102, 118, 711/131, 104, 141, 165, 168; 340/847; 345/521; 395/308

(56) References Cited

U.S. PATENT DOCUMENTS

| | | | | |
|---|---|---|---|---|
| 5,317,720 A | * | 5/1994 | Stamm et al. .............. | 395/425 |
| 5,388,841 A | * | 2/1995 | San et al. ..................... | 463/44 |
| 5,579,277 A | | 11/1996 | Kelly | |
| 5,719,808 A | * | 2/1998 | Harari et al. .......... | 365/185.33 |
| 5,784,291 A | * | 7/1998 | Chen et al. ................. | 364/491 |
| 5,936,971 A | * | 8/1999 | Harari et al. ............... | 365/200 |

* cited by examiner

Primary Examiner—Matthew Kim
Assistant Examiner—C. P. Chace
(74) Attorney, Agent, or Firm—Burns Doane Swecker & Mathis

(57) ABSTRACT

In a computer memory system, memory access operations are significantly enhanced by employing a data path between the read only memory (ROM) and the system processor that is separate and independent from the data path or paths between the system processor and the random access memory (i.e., RAM or DRAM). The separate ROM data path includes a full cache line buffer which stores the ROM data until the system data bus is available to transport the ROM data. With a separate ROM data path, that includes a full cache line buffer, memory access operations are more efficiently conducted because a RAM access (i.e., a read or write operation) and a ROM access (i.e., a read operation) can be executed concurrently.

18 Claims, 6 Drawing Sheets

MEMORY CONTROL DEVICE WITH SPLIT READ FOR ROM ACCESS

BACKGROUND

The present invention relates to an apparatus for accessing data from a computer memory device. More particularly, the present invention relates to an apparatus that employs a dual cache line buffer for accessing read only memory (ROM) data, wherein the dual cache line buffer is a separate and independent data path from the data path that is used to transport data to and from the random access memory (i.e., the RAM or DRAM).

FIG. 1 illustrates a conventional computer memory system 100. In FIG. 1, the microprocessor 103 sends and receives data and/or instructions to and from memory via system bus 105, a memory interface device 110, and one or more memory buses 115a and 115b. FIG. 1 also shows that the memory bus utilized for carrying ROM data is a common bus, such that it is shared, at least in part, with the memory bus (e.g., memory bus 115b) which carries data to and from DRAM.

For some conventional computer systems, a common memory bus that is shared by the RAM and the ROM is not a significant hindrance. That is because these computer systems do not store a large portion of their operating systems in ROM. Consequently, these systems do not access the ROM as often as other systems. In contrast, there are other computer systems that do store a large portion of their operating systems in ROM. Hence, these other systems access ROM more frequently, and the common memory bus architecture is problematic for these other systems.

The primary reason the common memory bus architecture is problematic for systems that frequently access ROM is that ROM devices are inherently slow. For example, a typical ROM burst access requires approximately 20 to 30 clock cycles. If the system clock is operating at 50 MHz (i.e., with a 20 nanosecond clock cycle), a complete ROM access period requires approximately 400 to 600 nanoseconds to complete. This means that the memory bus, e.g., memory bus 115b, is occupied with the task of accessing the ROM for at least 400 nanoseconds. Moreover, the system bus 105 will also sit idle for a substantial portion of the at least 400 nanosecond period, waiting to receive the ROM data from the memory bus 115b. Accordingly, both the system bus 105 and the memory buses 115a and 115b are precluded from conducting any other operations during the 400 nanosecond ROM access period. Such systems must, therefore, serialize all memory operations with ROM operations. Of course, this is inefficient since it slows down system operations and hinders system performance. Consequently, there is a need to provide a memory architecture design that minimizes the detrimental impact on system performance caused by frequent ROM access operations using a common memory bus architecture.

SUMMARY

The present invention is a computer memory access and control system which includes a cache line buffer for ROM and an independent ROM bus. More specifically, the present invention, in accordance with a preferred embodiment, actually employs two dual cache line buffers for ROM. In addition, the independent ROM memory bus is separate from and distinctly different than the RAM buses (or DRAM buses).

One advantage provided by the present invention is that the system bus and the RAM buses are now free to perform other tasks, e.g., data write and data read operations to and from DRAM, during a significant portion of the ROM access period. Another advantage is that the present invention is capable of pre-fetching ROM data from a next ROM address and storing that data in a second cache line buffer, thus further accelerating ROM operations and enhancing system performance.

In general, the dual cache line buffer for ROM provides a timing windfall equal to approximately 20 clock cycles (i.e., 400 nanoseconds) for each ROM access operation. For computer systems that frequently access ROM, the timing windfall realized, when accumulated over a large number of ROM access operations, is significant.

In view of the above, it is an object of the present invention to enhance system performance by employing an independent ROM data path.

It is yet another object of the present invention to enhance system performance by storing the ROM data in one of two cache line buffers until the system bus is available to receive the data, thus freeing the system bus and the memory bus to engage in other operations during a significant portion of each ROM access period.

In accordance with one aspect of the present invention, the foregoing and other objects are achieved by a computer system comprising a processing unit; a random access memory (RAM) connected to the processing unit by a RAM data path; and a read only memory (ROM) connected to the processing unit by a ROM data path. In this system, the ROM data path is separate and independent of the RAM data path.

In accordance with another aspect of the present invention, the foregoing and other objects are achieved by a computer memory access and control system comprising a processing unit; memory access control means connected to the processing unit by a first data bus; a random access memory connected to the memory access control means by a second data bus; and a read only memory (ROM) connected to the memory access control means by a third data bus. Here, the third data bus is separate and independent of the second data bus.

In accordance with yet another aspect of the present invention, the foregoing and other objects are achieved by a computer memory access and control system comprising a microprocessor; a first memory access control integrated circuit (IC) connected to the microprocessor by a system data bus; a random access memory (RAM) connected to the first memory access control IC by a RAM bus; and a read only memory (ROM) connected to the first memory access control IC by a ROM bus. Again, the ROM bus is separate and independent of the RAM bus.

In accordance with still another aspect of the present invention, the foregoing and other objects are achieved by a method of transferring data from a ROM to a system processor comprising the steps of transferring ROM data from a memory address in the ROM to a cache line buffer for ROM; accessing the system bus after the data has been transferred to the cache line buffer for ROM; transferring the data from the cache line buffer for ROM onto a system data bus that is connected to the system processor. In this method, the step of transferring data from a memory address in ROM to a cache line buffer for ROM can occur simultaneous to data transfers between the system processor and the RAM.

BRIEF DESCRIPTION OF THE DRAWINGS

The objects and advantages of the present invention will be understood by reading the following detailed description in conjunction with the drawings in which.

DETAILED DESCRIPTION

Figure 2:
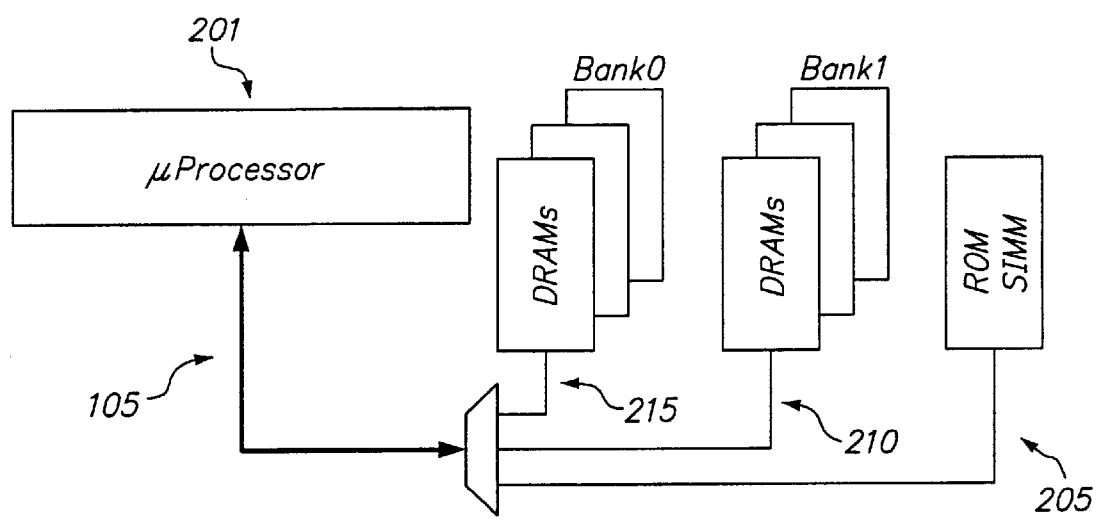
FIG. 2 is a diagram of the memory bus architecture of the present invention.

The present invention is a computer memory access and control system. In general, it serves as an interface between the system data bus and the system memory. Though it will be explained in greater detail below, the present invention includes two dual cache line buffers for ROM. As illustrated in FIG. 2, the present invention also employs a ROM bus 205 that is separate and independent of the random access memory (RAM) buses, for example, RAM buses 210 and 215.

Figure 3:
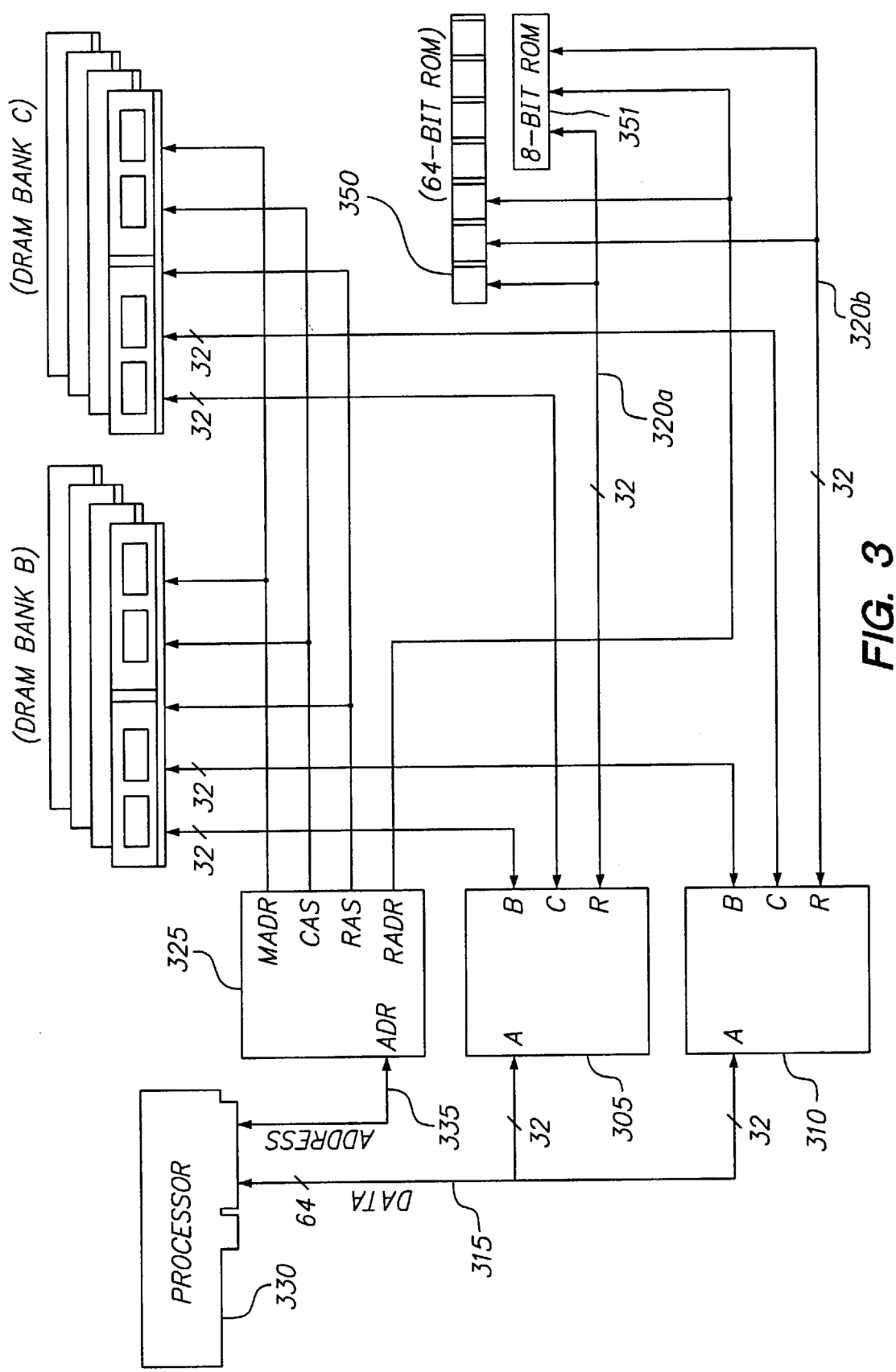
FIG. 3 is a diagram of a computer memory access and control system in accordance with a preferred embodiment of the present invention.

FIG. 3 shows the configuration of the computer memory access and control system in accordance with a preferred embodiment of the present invention. The preferred embodiment comprises two identical application specific integrated circuits (ASICs) 305 and 310, which physically control the flow of data between the various RAM and ROM modules and the system data bus 315. In the preferred embodiment illustrated in FIG. 3, each ASIC is a 32-bit device, and together they can accommodate a 64-bit memory operation. However, one skilled in the art will recognize that this embodiment could be modified to accommodate a memory system other than one with a 64-bit architecture.

Figure 1:
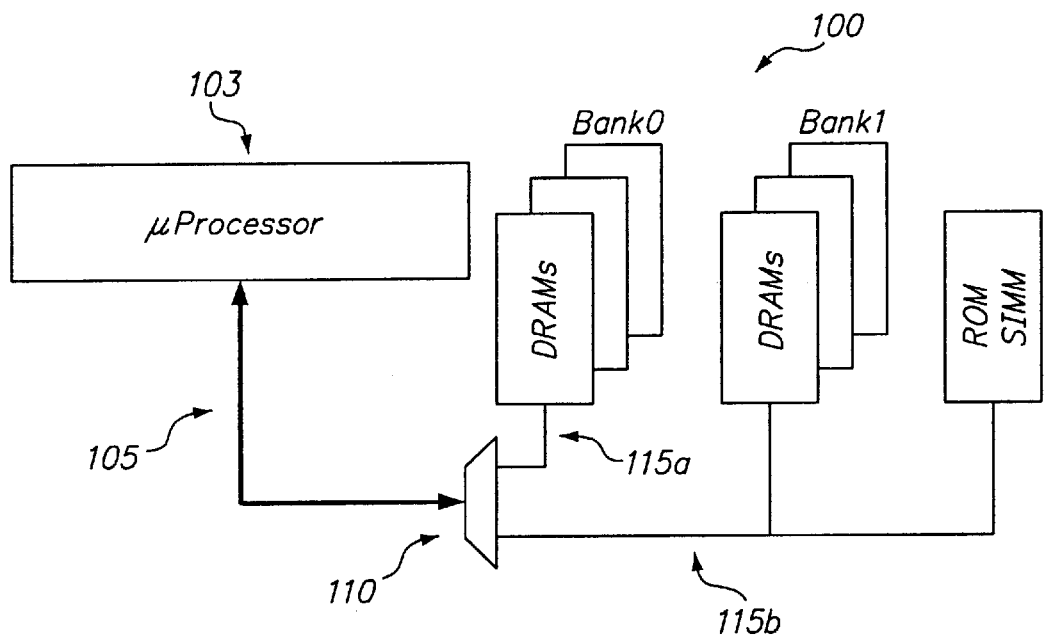
FIG. 1 is a diagram of a conventional computer memory system (PRIOR ART)

FIG. 3 also shows that each of the ASICs 305 and 310 contains a number of input/output (I/O) ports. I/O port A connects the corresponding ASIC to the system data bus 315, while I/O port B and I/O port C connect the corresponding ASIC to memory buses B and C respectively. Memory buses B and C, in turn, connect the two ASICs to DRAM bank B and DRAM bank C respectively. In addition, each ASIC contains an I/O port R which connects the corresponding ASIC to the ROM data bus 320a or 320b. It is important to note that I/O port R is separate and independent from I/O port B and I/O port C. A separate and independent I/O port R makes it possible to employ separate and independent data paths for RAM data and ROM data, thus distinguishing the present invention from conventional memory systems as illustrated in FIG. 1.

FIG. 3 also shows that the computer memory access and control system comprises a memory address control ASIC 325. The memory address control ASIC 325 receives memory address information from the system processor 330 via the system address bus 335. The memory address control ASIC 325 controls the location of each memory access by placing the address information on the appropriate address bus connected to I/O port MADR or RADR depending upon whether the next memory access involves the DRAM or one of the two ROMS (i.e., the 64-bit ROM 350 or the 8-bit ROM 351). The memory address control ASIC 325 also generates a row address strobe (RAS) signal and a column address strobe (CAS) signal, the functions of which are well understood in the art.

Figure 4:
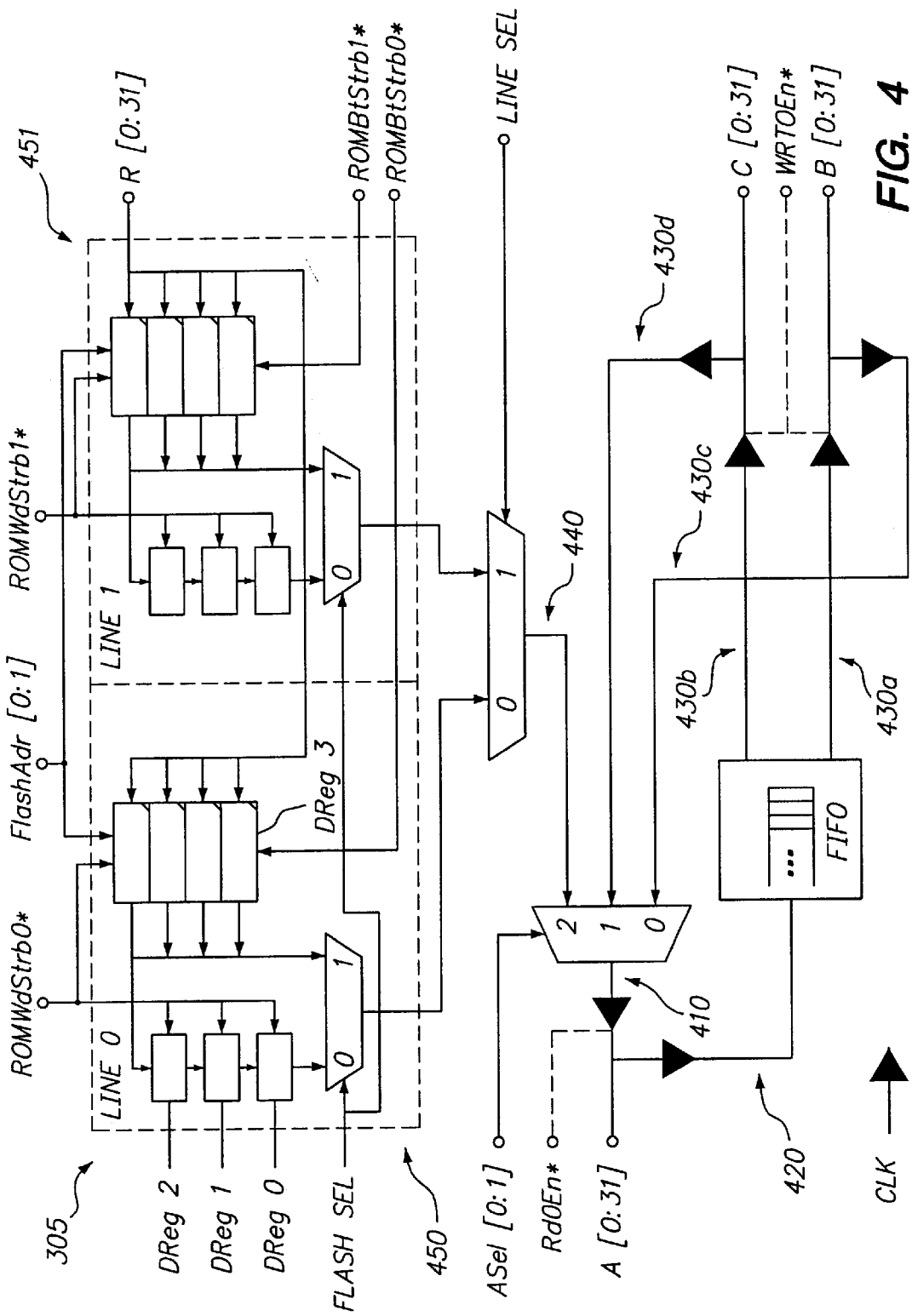
FIG. 4 is a diagram of a dual cache line buffer for ROM in accordance with a preferred embodiment of the present invention.

FIG. 4 shows the internal architecture for each of the ASICs 305 and 310 in accordance with a preferred embodiment of the present invention. In general, the internal architecture comprises the I/O ports A, B, C and R, which were previously mentioned; a number of data paths connecting the various I/O ports; and a number of control signals including ASel, for controlling which of the three memory buses R, B, or C is to be connected to the system bus A; FlashSel, for properly controlling the transfer of data from DReg0 to the system bus A during a burst read operation, and transferring data from DReg 3 to the system bus A during a single beat read operation; FlashAdr, for selecting one of the dual cache line buffers 450 or 451; ROMWdStrb0* and ROMWdStrb1* for strobing the 32-bit data words into and out of the various data registers DReg0, DReg1, DReg2, DReg3; ROMBtStrb0* and ROMBtStrb1*, for strobing data bits from the ROM bus R into DReg3; and an internal clock (CLK) which controls all of the internally synchronized storage elements such as the above-identified cache line buffer data registers DReg0, DReg1, DReg2, and DReg3.

As mentioned, I/O port A connects the corresponding ASIC to the system data bus 315. More specifically, I/O port A serves as the interface between the system data bus 315 and the read and write data paths 410 and 420. I/O port B and I/O port C, in turn, serve as interfaces between the DRAM memory buses and the DRAM read and DRAM write data paths 430a, 430b, 430c and 430d. When control signal WrtOEn* is active, I/O ports B and C function as output ports so that data can be written to DRAM. When WrtOEn* is deactivated, I/O ports B and C function as input ports so that data can be read from DRAM.

It was also previously mentioned that each control ASIC 305 and 310 contains an I/O port R, wherein I/O port R serves as an interface between the ROM data bus 320a or 320b, and a ROM data path 440. The ROM data path 440 actually comprises dual full cache line buffers 450 and 451. Just as I/O port R is separate and independent from I/O ports B and C, the ROM data path 440, including the dual cache line buffers, is separate and independent from the DRAM read and write data paths 430a, 430b, 430c, and 430d. This independent ROM data path 440, along with its dual cache line buffer design represents a distinction over conventional memory system architectures as described above. As will be explained in greater detail below, the ROM data path 440 allows the present invention to simultaneously conduct DRAM operations during a substantial portion of a ROM access operation, thus significantly enhancing the overall speed and efficiency of system memory operations.

Each of the cache line buffers, for example cache line buffer 450, comprises a plurality of data registers as illustrated in FIG. 4. The data registers are used for shifting and storing the ROM data as it is transferred from ROM to the system bus 315 via I/O port A. The first of these data registers is a 4-byte holding register 460, herein referred to as DReg3. In addition, there are three, sequentially configured 32-bit data registers, herein referred to as DReg2, DReg1, and DReg0.

The specific path taken by the ROM data through the various data registers depends upon the type of read operation being performed. There are four exemplary ROM read operations associated with the preferred embodiment illustrated in FIG. 4: a 64-bit burst read ROM operation; an 8-bit burst read ROM operation; a 64-bit single beat read ROM operation; and an 8-bit single beat read ROM operation. Each of these exemplary ROM read operations will be described hereinbelow to illustrate the function of the cache line buffers.

Figure 5:
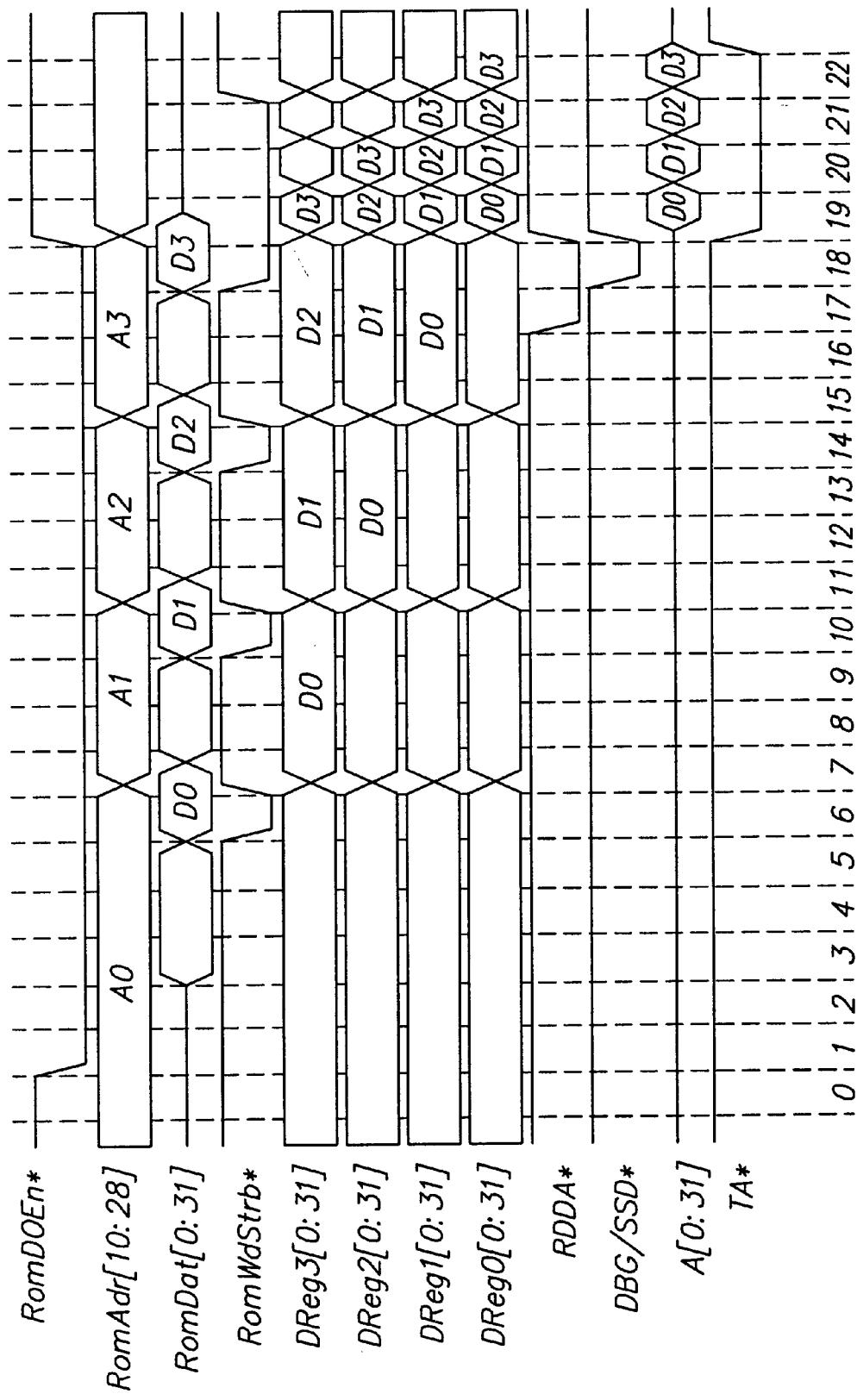
FIG. 5 is a timing diagram for a 64-bit burst read ROM operation.

FIG. 5 depicts the timing diagram for the 64-bit burst read ROM operation. In a preferred embodiment of the present invention, the 64-bit burst read ROM operation involves the transfer of four 32-bit data quantities D0, D1, D2 and D3 from four memory locations A0, A1, A2 and A3 located in the 64-bit ROM 350. Therefore, a total of 128 bits of data are transferred from the 64-bit ROM 350, to the system data bus 315 via one of the two cache line buffers illustrated in FIG. 4 (e.g., cache line buffer 450), during a 64-bit burst read ROM operation. Since there are actually two ASICs 305 and 310 operating in parallel, as illustrated in FIG. 3, a single 64-bit burst read ROM operation will involve the transfer of 256 bits of data, 128 bits per ASIC.

To begin the 64-bit burst read ROM operation, the system processor 330 must first reset FlashSel=0 and reset RomDOEn*=0. When RomDOEn* is reset at the end of cycle 0, as illustrated in FIG. 5, the four 32-bit data quantities D0, D1, D2 and D3, stored in the corresponding 64-bit ROM memory locations A0, A1, A2 and A3, will become accessible such that when the RomWdStrb* signal transitions low during cycles 6, 10, 14 and 18, the four 32-bit data quantities will be strobed from the ROM data bus (RomDat) into DReg3, DReg2, DReg1 and DReg0 in sequence, as illustrated. More specifically, D0 will be strobed into DReg3 during cycle 6. During cycle 10, D0 will be strobed into DReg2 and D1 will be strobed into DReg3. During cycle 14, D0 will be strobed into DReg1, D1 will be strobed into DReg2 and D2 will be strobed into DReg3. During cycle 18, D0 will be strobed into DReg0, D1 will be strobed into DReg1, D2 will be strobed into DReg2 and D3 will be strobed into DReg3. Once all four 32-bit ROM data quantities D0, D1, D2 and D3 are stored in the cache line buffer, as indicated by the Read Data Available (RDDA*) signal, the requesting master (i.e., any device capable of accessing data on the system data bus 315 such as a central processing unit or a co-processing unit) will be granted the system data bus 315 so that it can receive the ROM data, as indicated by the transition of TA* from high to low during cycle 19. The next four cycles (i.e., cycles 19 through 22) are dedicated to shifting the 32-bit data quantities from the data registers (i.e., DReg0, DReg1, DReg2 and DReg3) onto the system data bus 315, in a first-in-first-out (i.e., FIFO) format, via I/O port A.

Figure 6:
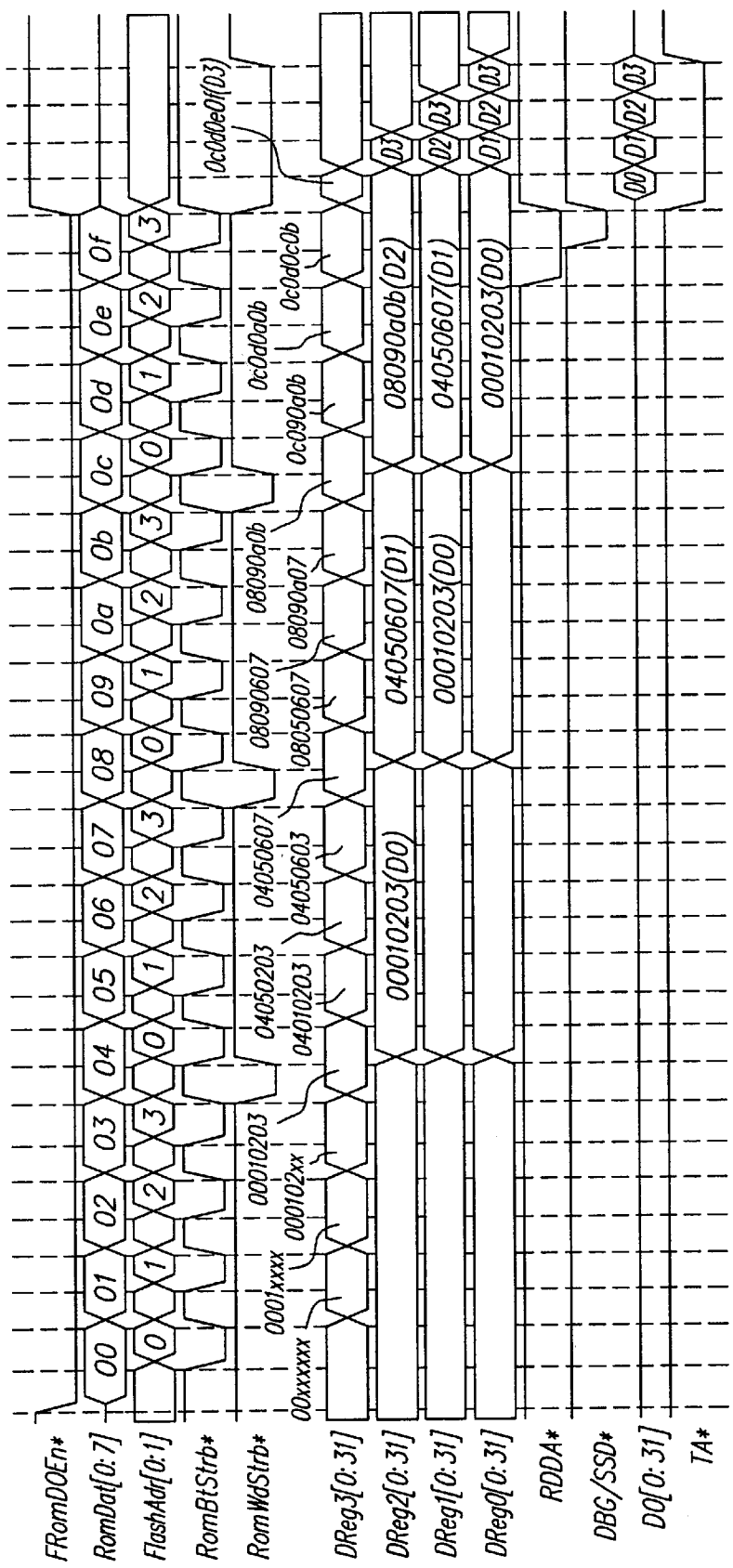
FIG. 6 is a timing diagram for an 8-bit burst read ROM operation.

FIG. 6 depicts the timing diagram for the 8-bit burst read ROM operation. In a preferred embodiment of the present invention, the 8-bit burst read ROM operation also involves the transfer of four 32-bit data quantities D0, D1, D2 and D3, wherein each 32-bit data quantity comprises four 8-bit quantities (i.e., four 1 byte quantities). For example, in FIG. 6, the 32-bit data quantity D0 comprises the four 8-bit quantities 00, 01, 02, and 03; D1 comprises 04, 05, 06 and 07; D2 comprises 08, 09, 0a and 0b; D3 comprises 0c, 0d, 0e and 0f. However, in contrast with the 64-bit burst read ROM operation, the 8-bit burst read ROM operation must first build each 32-bit data quantity by shifting the 8-bit data quantities 00 through 0f, as illustrated in FIG. 6, into the four 1 byte registers that make up DReg3. As one of skill would expect, this read operation take more time than the 64-bit burst read ROM operation, but eventually, the same amount of data is transferred, 128 bits per ASIC.

To begin the 8-bit burst read ROM operation, the system processor 330 resets FlashSel=0 and FRomDOEn*=0. When the FRomDOEn signal transitions low, the 8-bit data quantities 00 through 0f are sequentially loaded onto the ROM data bus (RomDat) during an equal number of ROM data access periods. The 8-bit data quantities are then strobed into DReg3 by the RomBtStrb* signal, as illustrated. For example, each of the 8-bit data quantities 00, 01, 02 and 03 comprising 32-bit data quantity D0 will be strobed into one of the four 1 byte data registers which make up DReg3. After all four 8-bit quantities are shifted into DReg3, the 32-bit data quantity D0 is strobed into DReg2 by the RomWdStrb* signal. At the same time, the RomBtStrb* signal will begin storing the second set of four 8-bit quantities, which comprise the second 32-bit data quantity D1 (i.e., 04, 05, 06 and 07), in the four 1 byte data registers of DReg3, one byte at a time, as illustrated in FIG. 6. This process continues until all four 32-bit data quantities D0, D1, D2 and D3 are buffered in DReg0, DReg1, DReg2 and DReg3 respectively, as indicated by the transition of RDDA* from high to low. At this point, the requesting master will be granted the system data bus 315, as indicated by the transition of TA* from high to low. The four 32-bit data quantities are then transferred to the system data bus 315, via I/O port A, over the next four clock cycles.

Figure 7:
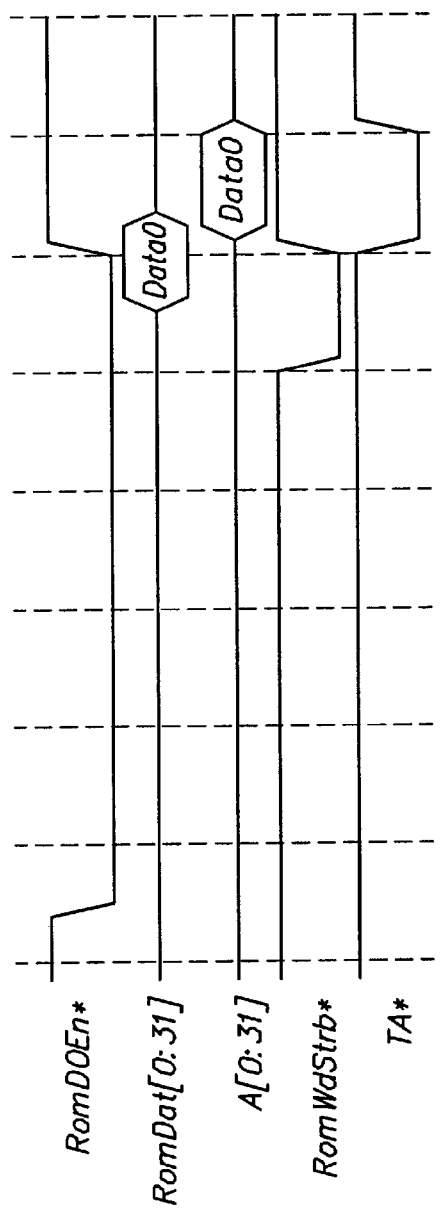
FIG. 7 is a timing diagram for a 64-bit single beat read ROM operation.

FIG. 7 depicts the timing diagram for the 64-bit single beat read ROM operation. In a preferred embodiment of the present invention, the 64-bit single beat read ROM operation involves the transfer of a single 32 bit word from the 64-bit ROM to the system data bus 315 via one of the two ASICs. Again, since there are actually two ASICs operating in parallel, the read operation involves transferring a total of 64 bits, 32 per ASIC.

To begin the 64-bit single beat read ROM operation, the system processor 330 sets FlashSel=1 and resets RomDOEn*=0. When the single 32-bit word becomes available on the ROM data bus (RomDat), the RomWdStrb* signal is used to strobe the 32-bit word simultaneously into the four 1 byte data registers which make up DReg3. Once the data is buffered in DReg3, the requesting master will be granted the system data bus 315, as illustrated by the transition of TA* from high to low, and the single 32-bit data word will be transferred from DReg3 to the system bus 315, via I/O port A in a single clock cycle.

Figure 8:
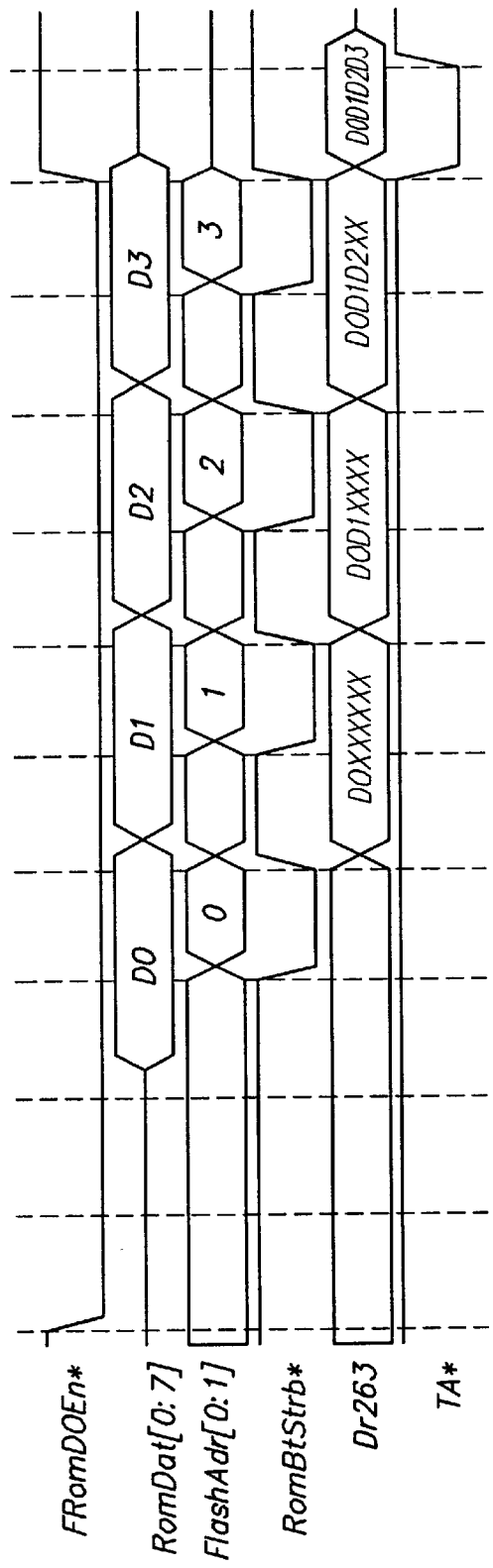
FIG. 8 is a timing diagram for an 8-bit single beat read ROM operation.

FIG. 8 depicts the timing diagram for the 8-bit single beat read ROM operation. In a preferred embodiment of the present invention, the 8-bit single beat read ROM operation involves the transfer of a single 32 bit word from the 8-bit ROM 351 to the system data bus 315 via one of the two ASICs. However, in contrast with the 64-bit single beat read ROM operation, the 8-bit ROM read operation transfers the single 32-bit word into DReg3 of each ASIC one byte at a time. Again, considering both ASICs, the total number of data bits transferred during the 8-bit ROM read operation is 64, 32 per ASIC.

To begin the 8-bit single beat read ROM operation, the system processor 330 sets FlashSel=1 and resets RomDOEn*=0. When the FRomDOEn* signal is reset, the 32-bit data word will become available on the ROM data bus (RomDat) as a sequence of four data bytes D0, D1, D2 and D3 as illustrated in FIG. 8. As each byte becomes available, the RomBtStrb* signal will strobe the currently available byte into one of the four 1 byte data registers which make up DReg3, in accordance with the FlashAdr signal. Once all four bytes are buffered in DReg3, the requesting master will be granted the system data bus 315, as indicated by the transition of TA* from high to low, and the 32-bit data word comprising D0, D1, D2 and D3 will be transferred to the system data bus 315, via I/O port A, in a single clock cycle.

As stated, each ASIC 305 and 310 contains two cache line buffers, as illustrated in FIG. 4. The advantage provided by employing two cache line buffers in each ASIC 305 and 310 is that the system can prefetch the next ROM read operation. For example, during the 64-bit burst read ROM operation illustrated by the timing diagram in FIG. 5, all 128 bits of ROM data are buffered by the end of clock cycle number 18. All that remains to complete the 64-bit burst read ROM operation is to shift the 32 bit words from the data registers DReg3, DReg2, DReg1 and DReg0 onto the system data bus 315; this requires an additional four clock cycles. During these four additional clock cycles, the system can begin loading ROM data into the other cache line buffer, such that when the ROM data from the former read operation is complete, the ROM data from the latter read operation is already partially buffered. Although the time saved during these four clock cycles may seem relatively insignificant, for computer systems that frequently access ROM, the time savings can be substantial.

It was also previously stated that the present invention allows the system data bus 315 to conduct other memory operations, particularly with the DRAM, during a substantial portion of a ROM memory read operation. This can be better illustrated by referring once again to FIG. 5 and the 64-bit burst read timing diagram. Since prior systems do not employ separate and independent cache line buffers for ROM, those systems would be required to utilize the system data bus at the beginning of the read operation (i.e., at clock cycle 1). Additionally, the system data bus would remain allocated (i.e., prevented from conducting other operations) until the transfer of ROM data to the system data bus was complete (i.e., by the end of clock cycle 22). In contrast, the cache line buffers of the present invention preclude the system from having to utilize the system data bus 315 until the ROM data is completely buffered and available for transfer to the system bus (i.e., by the end of clock cycle 18). Therefore, the present invention provides a time savings of 18 clock cycles for other operations. With a 20 nanosecond clock cycle, this results in a savings of 360 nanoseconds for other transactions during each ROM read operation. Again, for systems that frequently access ROM, the savings can be substantial.

The present invention has been described with reference to a preferred embodiment. However, it will be readily apparent to those skilled in the art that it is possible to embody the invention in forms other than the preferred embodiment described above. Furthermore, this may be done without departing from the spirit of the invention, and the preferred embodiment should not be considered restrictive in any way. The scope of the invention is given by the appended claims, rather than the preceding description, and all variations and equivalents which fall within the range of the claims are intended to be embraced therein.

What is claimed is:

1. A computer system comprising:
   a processing unit;
   a memory access control component connected to the processing unit by a system data bus;
   a random access memory (RAM) connected to the memory access control component by at least one RAM data path; and
   a read only memory (ROM) connected to the memory access control component by a ROM data path, wherein said ROM data path is separate from said RAM data path and comprises at least one cache line buffer for ROM;
   wherein said computer system is configured to allow a ROM memory operation to be conducted simultaneously with a transfer between the processing unit and the RAM.

2. A computer memory access and control system comprising:
   a processing unit;
   memory access control means connected to the processing unit by a first data bus;
   a random access memory (RAM) connected to said memory access control means by a second data bus; and
   a read only memory (ROM) connected to said memory access control means by a third data bus, wherein said third data bus is separate from said second data bus;
   wherein said computer memory access and control system is configured to allow said first data bus to conduct other memory operations during a portion of a ROM memory operation; and
   wherein said memory access control means comprises:
      a first data path for linking the third data bus with the first data bus, wherein said first data path comprises at least one cache line buffer for ROM; and
      a second data path for linking the second data bus with the first data bus, wherein said first data path and said second data path are separate data paths.

3. A computer memory access and control system comprising:
   a microprocessor;
   a first memory access control integrated circuit (IC) connected to said microprocessor by a system data bus;
   a random access memory (RAM) connected to said first memory access control IC by a RAM bus;
   a read only memory (ROM) connected to said first memory access control IC by a ROM bus; wherein said ROM bus is separate and independent of said RAM bus; and
   a first ROM data path within said first memory access control IC connected to said ROM bus, wherein said first ROM data path comprises a cache line buffer:
   wherein said computer memory access and control system is configured to allow said system data bus to conduct other memory operations during a portion of a ROM memory operation.

4. The computer memory access and control system in accordance with claim 3, wherein said first memory access control IC comprises:
   a RAM data path connected to the RAM bus.

5. The computer memory access and control system in accordance with claim 3, wherein the cache line buffer comprises:
   at least one data register.

6. The computer memory access and control system in accordance with claim 3, wherein said first memory access control IC further comprises:
   a second ROM data path connected to the ROM bus, wherein said second ROM data path comprises a cache line buffer.

7. The computer memory access and control system in accordance with claim 6, wherein the cache line buffer of said second ROM data path comprises:
   at least one data register.

8. The computer memory access and control system in accordance with claim 3, wherein said first memory access control IC further comprises:

data path multiplexing means for selecting whether ROM data from said ROM data path is to be placed on the system data bus, or whether RAM data from said first RAM data path is to be placed on the system data bus.

9. The computer memory access and control system of claim 3, further comprising:

a second memory access control IC configured in parallel with said first memory access control IC.

10. In a computer-based system comprising a system processor, a random access memory (RAM), and a read only memory (ROM), a method for transferring data from the ROM to the system processor comprising the steps of:

transferring data from a memory address in the ROM to a cache line buffer for ROM;

accessing the system bus after the data has been transferred to the cache line buffer for ROM;

transferring the data from the cache line buffer for ROM onto a system data bus that is connected to said system processor, wherein said step of transferring data from a memory address in ROM to a cache line buffer for ROM occurs simultaneous to data transfers between the system processor and the RAM and said cache line buffer for ROM resides on a data bus for ROM that is separate from a system data bus and a RAM data bus.

11. The method of claim 10, further comprising the step of:

prefetching data from a second memory address in the ROM and transferring it to a second cache line buffer residing on a data bus for ROM that is separate from the system and data bus and the RAM data bus, wherein said step of prefetching data from a second memory address occurs after the data from the first memory address has been loaded into the first cache line buffer and before the data from the first memory address has been transferred from the first cache line buffer onto the system data bus.

12. The computer memory access and control system in accordance with claim 2, wherein said other memory operations are conducted by the random access memory.

13. The computer memory access and control system in accordance with claim 3, wherein said other memory operations are conducted by the random access memory.

14. A computer memory access and control system comprising:

a processing unit;

memory access control means connected to the processing unit by a system data bus;

a random access memory (RAM) connected to said memory access control means by a RAM data bus;

a read only memory (ROM) connected to said memory access control means by a ROM data bus, wherein said ROM data bus is separate from said RAM data bus;

a RAM data path for linking the RAM data bus with the system data bus; and a ROM data path for linking the ROM data bus with the system data bus, wherein said RAM and ROM data paths are separate data paths;

wherein said ROM data path includes a cache line buffer for ROM;

wherein said memory access control means further includes data path multiplexing means for selecting whether ROM data from said ROM data path is to be placed on the system data bus, or whether RAM data from said RAM data path is to be placed on the system data bus;

wherein said computer memory access and control system is configured to allow a ROM memory operation to be conducted simultaneously with data transfer between the system processor and the RAM.

15. The computer system of claim 1, wherein said at least one cache line buffer for ROM resides on at least one memory access control integrated circuit (IC).

16. The computer system of claim 1, wherein said at least one cache line buffer for ROM comprises two cache line buffers for ROM.

17. The computer system of claim 15, wherein said at least one cache line buffer for ROM comprises two cache line buffers for ROM, and said at least one memory access control IC comprises two memory access control ICs.

18. The computer memory access control system of claim 2, comprising at least two cache line buffers for ROM.

* * * * *